March 27, 1962 J. M. HALL ET AL 3,027,117
MISSILE GASEOUS BEARING SYSTEM
Filed Oct. 22, 1959 3 Sheets-Sheet 1

Jewell M. Hall
Hugh S. McCullough Jr.
INVENTOR.

BY S. J. Rotondi,
A. T. Dupont, and
Alvin E. Moore.

March 27, 1962    J. M. HALL ET AL    3,027,117
MISSILE GASEOUS BEARING SYSTEM

Filed Oct. 22, 1959                3 Sheets-Sheet 2

Jewell M. Hall
Hugh S. McCullough Jr.
       INVENTOR.

BY  S. J. Rotondi,
    A. T. Dupont, and
    Alvin E. Moore.

March 27, 1962   J. M. HALL ET AL   3,027,117
MISSILE GASEOUS BEARING SYSTEM

Filed Oct. 22, 1959                 3 Sheets-Sheet 3

Jewell M. Hall
Hugh S. McCullough Jr.
*INVENTOR.*

BY S. J. Rotondi,
A. T. Dupont, and
Alvin E. Moore.

United States Patent Office 3,027,117
Patented Mar. 27, 1962

3,027,117
MISSILE GASEOUS BEARING SYSTEM
Jewell M. Hall, 162 Warren Drive NW., and Hugh S. McCullough, Jr., 1405 Hermitage Ave. SE., both of Huntsville, Ala.
Filed Oct. 22, 1959, Ser. No. 848,169
4 Claims. (Cl. 244—14)
(Granted under Title 35, U.S. Code (1952), sec. 266)

The invention described herein may be manfactured and used by or for the Government for governmental purposes without the payment of any royalty thereon.

This invention relates to a missile gaseous bearing system for supplying pressurized gas to air bearings in a missile guidance package.

In such a system, there is a need for a device which will replenish the pressurized gas at predetermined time intervals. There is a further need for a system which has an automatic control, which can be preset for the desired time interval between replenishing of the pressurized gas. This system should be small in size and light in weight.

In view of these facts, an object of this invention is to provide a pressurized-gas system in which the gas is replenished at predetermined intervals.

Another object is to provide a system, which can be preset for the desired time interval between replenishing of the gas and which is automatic in operation.

A further object is to provide a pressurized-gas system that is small in size and light in weight.

The foregoing and other objects will become more fully apparent from the following detailed description and from the accompanying drawings, in which.

Figure 1:
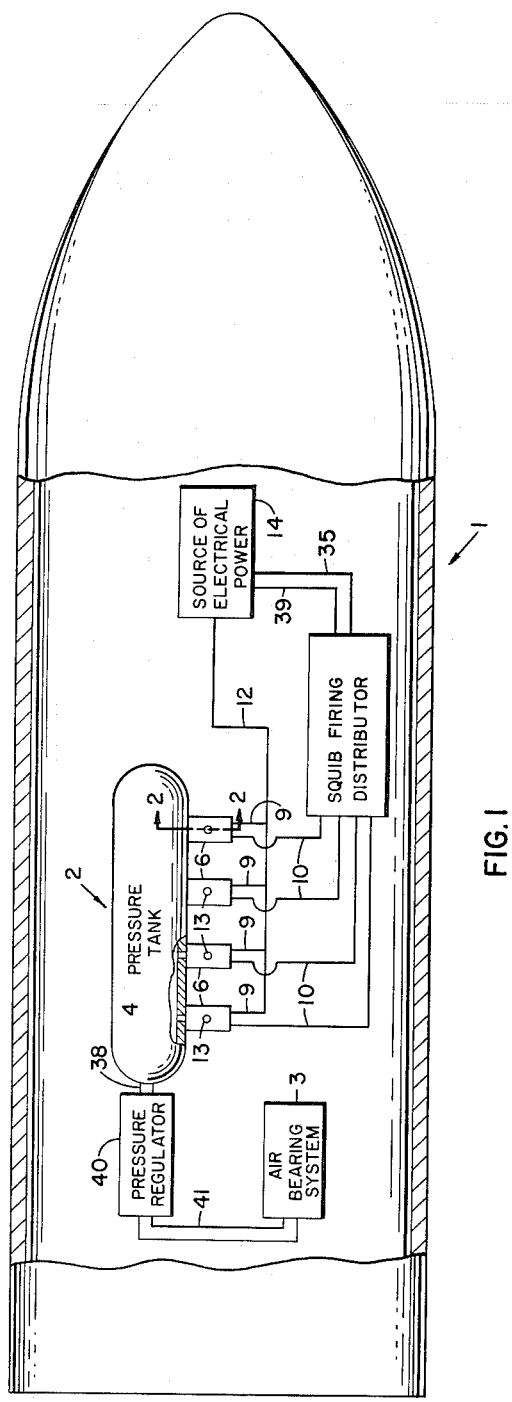
FIGURE 1 is a diagrammatic view showing the gaseous bearing system in a missile, which has part of its body broken away for clarity.
Figure 2:
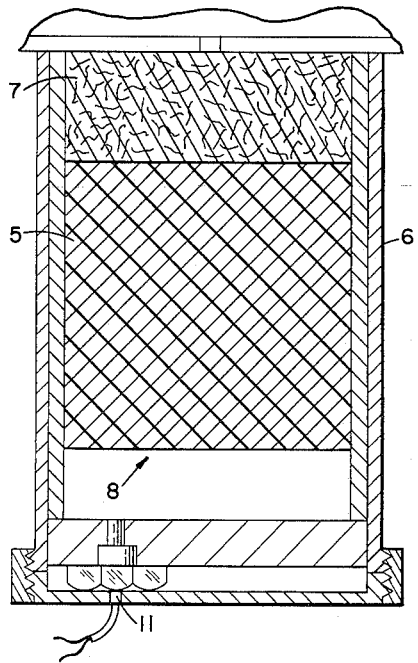
FIGURE 2 is a sectional view along the line 2—2 of FIGURE 1, showing one type of the pressure creating device of the invention.

In the drawings, wherein for the purpose of illustration there are shown different embodiments of the invention, and particularly in FIGURES 1, 2, 4 and 5, the numeral 1 designates a missile body having a pressure system 2 operably connected to an air bearing system 3, or other missile components that require pressurized gas in amounts and at a rate that may be predetermined.

A pressure tank 4, which forms part of system 2, contains an aperture in one end and a plurality of apertures intermediate its ends.

To these intermediate apertures casings 6 are attached. At this point of its connection with tank 4 each casing is provided with a filter 7. At its inclosed end, opposite from said connection, the casing incloses a device 8 for creating pressurized gas, electrical conductors 9 and 10 and pressure actuated valves 13. This arrangement insures that pressure created by the gas-creating devices, enters tank 4 thru the filtered end of casings 6.

Electrical conductors 9 are connected to a source of electric power 14 by conductor 12. Each of the conductors 10 is connected to one of a plurality of contacts 16 of a time control device 18.

The gas-creating devices comprise an ignitable gas generating material 5 and an electrically fired squib 11 for igniting said material. Material 5 comprises any known chemical which will produce a substantial quantity of gas when it burns, such as the known types of solid propellant or gun powder.

The devices fit inside casings 6 and their squibs are electrically connected to conductors 9 and 10.

Time control device 18 comprises a nonconducting base 20 having an aperture 19, and a plurality of contacts 16 radially arranged relative to aperture 19. A circular conductive plate 21, having an aperture 22 in its center, is attached to base 20. A timing motor 24, preferably adjustable by means of a rheostat 25 or the like to provide a desired constant speed, is secured to said base and geared, preferably by reduction gearing 30, to a rotary shaft 26, which extends thru said base and plate. A nonconducting shaft 28 has one end fitted over and drivably attached to shaft 26, and another end that is provided with shoulder 29, and a set of threads. A pair of rigidly connected contact arms 32 and 33 abut said shoulder and are secured to shaft 28 by nut 34. A cover 36 is secured to said base.

Contact arm 32 has two legs, which contact plate 21 and rotate around the axis of shaft 28. Contact arm 33 rotates with member 32 and successively connects member 21 to contacts 16 as the members rotate around the axis of shaft 28.

Plate 21 is connected to the source of power by conductor 35, which is also electrically connected to one side of motor 24 via conductor 37. The other side of motor 24 is connected to the source of power by conductor 39.

A pressurized-gas line 38 has one end secured to the end aperture of tank 4 and the other end secured to one side of a pressure regulator 40. The other side of regulator 40 is connected to air bearing system 3 by pressure line 41.

The operation of this embodiment is as follows:

Tank 4 is charged with pressure, and the time control device is adjusted to give the desired time interval between firing of the squibs. Conductor 39 is secured to the source of power and the missile is put in flight.

Motor 24 starts its timed rotation of arms 32 and 33. Arm 32 stays in contact with one side of the source of power, while arm 33 completes the circuit with the other side of the power supply, each time it touches one of contacts 16.

This completed circuit remains closed only long enough to burn or explode one of the pressure creating devices, depending on which of contact 16 is engaged by arm 33; and the combustion or explosion of the device opens the circuit.

The pressurized-gas in tank 4 is thereby automatically replenished by a substantially predetermined amount when one of the pressure creating devices 8, after a preset time interval, is fired.

Figure 3:
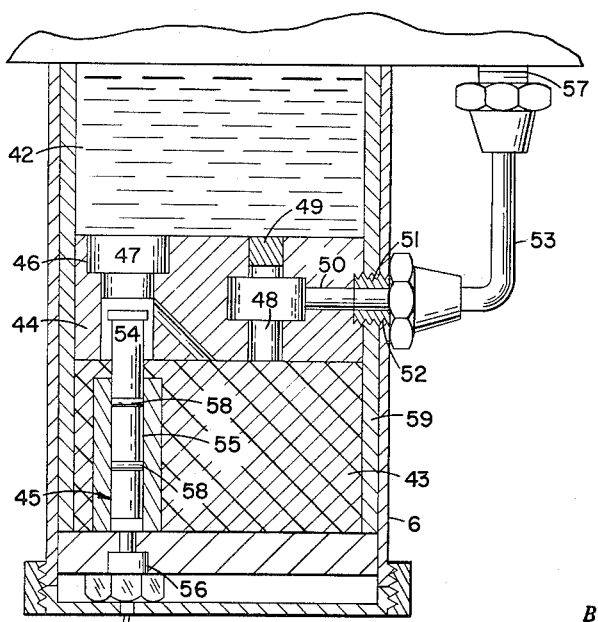
FIGURE 3 is a sectional view of a second embodiment of the pressure creating device, which utilizes chemicals separated by a member adapted to prevent mixing of the chemicals until a predetermined time, for creating pressure in the system.
Figure 4:
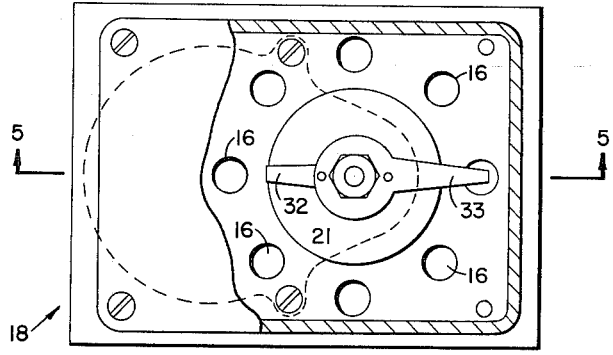
FIGURE 4 is a plan view of the time control device used in the embodiments.
Figure 5:
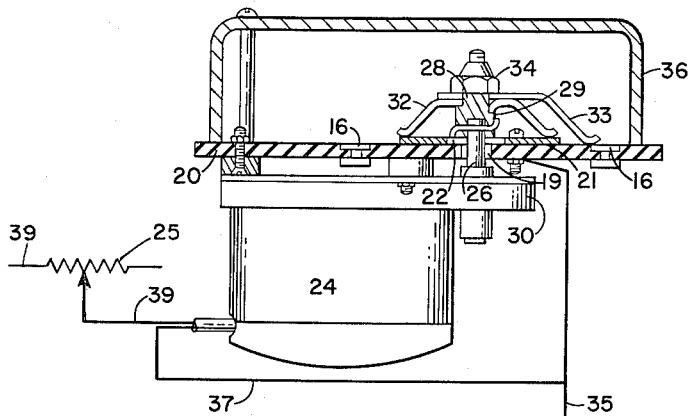
FIGURE 5 is an elevational view, partly in section, along the plane 5—5 of FIGURE 4.

In the embodiment shown in FIGURE 3, the pressure is created by two gas generating chemicals 42 and 43, such as water and lithium hydride or water and magnesium hydride. These chemicals may comprise two liquids, or a solid and a liquid. The chemicals are separated by member 44, secured to cartridge case 59. Member 44 contains an aperture 46, closed by a movable plug 47 which temporarily prevents connection of the two chemicals. The member also has a passage 48—50, temporarily closed by pressure responsive plug 49. One end of each aperture 50 is enlarged and screwthreaded, so as to receive a connector 51 fitted thru opening 52 in holder 6. In this embodiment the holders are also secured to the tank, but not over the plurality of apertures.

Each connector 51 receives one end of a conduit 53. The other end of each conduit 53 is connected at 57 to tank 4, joined to the plurality of apertures to provide a gas-supply passage from said pressure creating device to said tank.

Plug 47, is adapted to separate the chemicals until unseated by piston 54 of fluid motor 45. This piston is reciprocable in cylinder 55, which is connected with squib 56, that supplies operating pressure for piston 54. A pressure-tight fit is maintained between the cylinder and piston by a plurality of O-rings 58. The remainder of the components are the same as in the first embodiment.

The operation of this embodiment is the same as that of the first embodiment, except in the functioning of the pressure-creating means. When the electrical circuit is closed by the circuit governor a squib is fired as described in the first embodiment; but in the embodiment of FIGURE 3 the squib serves to operate piston 54.

When piston 54 is thus operated by gas from the squib, the piston drives plug 47 upward from its seat, thus allowing the two gas generating chemicals to mix and creating a rise in pressure. This pressure then enters the upper chemical chamber, at a predetermined pressure the gas forces plug 49 from its seat. The gas then passes thru aperture 50 and conduit 53 to tank 4.

The remainder of the operation is the same as the operation of the first embodiment.

It is to be understood that the forms of the invention that are herein shown and described are preferred embodiments, and that various changes in the shape, size and arrangement of parts may be resorted to without departing from the spirit of the invention, or the scope of the subjoined claims.

The following invention is claimed:

1. A gaseous bearing system comprising: a pressurized tank provided with an outlet aperture at one end and a plurality of inlet apertures intermediate its ends; a pressure line secured to said end aperture; a plurality of casings, each of which has an apertured end secured to said tank, in flow connection with one of said inlet apertures; a plurality of electrically fired squibs in said casings; a control device comprising a nonconducting, contact-supporting plate having an aperture, a flat, apertured plate of electrical conductive material fixed to said nonconducting plate, a plurality of spaced contacts secured to said nonconducting plate and radially arranged relative to said first-named aperture, electrical means connecting each of said plurality of spaced contacts to one side of one of said squibs, a rotatable contact engaged with said flat plate, a second rotatable contact fixed to said first rotatable contact and successively engageable with said spaced contacts, a rotary shaft nonconductively supporting said rotatable contacts; a variable timing means connected to said rotary shaft for firing said squibs at predetermined intervals; a source of electric power; means electrically connecting said source of power to said flat plate, said timing means and the other side of each of said squibs; chemical means in each of said casings influenced by the burning of its adjacent squibs to form pressurized gas, which enters said tank thru said apertured end; and an air bearing system connected to said outlet pressure line, whereby said bearing system utilizes said pressurized gas.

2. A missile gaseous bearing system comprising: a pressurized tank provided with an outlet aperture and a plurality of inlet apertures; a pressure line secured to said outlet aperture; a plurality of casings, each of which has an apertured end secured to said tank, in flow connection with one of said inlet apertures; a plurality of gas replenishing means in said casings; an automatic control device electrically connected to one side of each of said gas replenishing means, said control device comprising a circuit-determining distribution, and a timing motor operably connected to said distributor; variable timing means rotatably attached to said control means for regulating the time interval between firing said gas replenishing means, means for adjusting said variable timing means; a source of electric power; means electrically connecting said source of power to the other side of said control device, said timing means and the other side of each of said gas replenishing means; chemical means in each of said casings for forming pressurized gas, which enters said tank thru said inlet apertures.

3. A device as set forth in claim 2, in which said gas replenishing means comprises a plurality of electrically fired squibs, a gas generating chemical, a plurality of casings for housing said squibs and chemical and electrical means connecting one side of each of said squibs to said source of power.

4. A device as set forth in claim 2, in which said gas replenishing means comprises a plurality of cartridges, each of which comprises; two chemicals; a movable member separating said chemicals; and a fluid motor flow-connected to one of said squibs; operable by pressurized gas from said one squib, for moving said movable member, whereby said chemicals are allowed to come together and form a gas.

References Cited in the file of this patent
UNITED STATES PATENTS
580,613    Esson _____ Apr. 13, 1897